(12) United States Patent
Schmitt et al.

(10) Patent No.: US 10,095,752 B1
(45) Date of Patent: *Oct. 9, 2018

(54) METHODS AND APPARATUS FOR CLUSTERING NEWS ONLINE CONTENT BASED ON CONTENT FRESHNESS AND QUALITY OF CONTENT SOURCE

(71) Applicant: Google Inc., Mountain View, CA (US)

(72) Inventors: Michael Schmitt, Mountain View, CA (US); Krishna Bharat, San Jose, CA (US); Michael Curtiss, Sunnyvale, CA (US)

(73) Assignee: Google LLC, Mountain View, CA (US)

( * ) Notice: Subject to any disclaimer, the term of this patent is extended or adjusted under 35 U.S.C. 154(b) by 56 days.

This patent is subject to a terminal disclaimer.

(21) Appl. No.: 15/145,486

(22) Filed: May 3, 2016

Related U.S. Application Data

(63) Continuation of application No. 13/548,930, filed on Jul. 13, 2012, now Pat. No. 9,361,369, which is a
(Continued)

(51) Int. Cl.
*G06F 17/30* (2006.01)
*H04L 29/08* (2006.01)

(52) U.S. Cl.
CPC ...... *G06F 17/3053* (2013.01); *G06F 17/3071* (2013.01); *H04L 67/02* (2013.01)

(58) Field of Classification Search
CPC ... G06F 17/3071; G06F 17/3053; H04L 67/02
See application file for complete search history.

(56) References Cited

U.S. PATENT DOCUMENTS 5,293,552 A 3/1994 Aalbersberg
5,724,567 A 3/1998 Rose et al.
(Continued)

FOREIGN PATENT DOCUMENTS

CA 2443036 9/2003
JP 8335265 12/1996
(Continued)

OTHER PUBLICATIONS

Sato et al. Infomation Processing Society of Japan Technical Reports, IPSJ, issued on Mar. 15, 2002, Year 2002-vol. 28 p. 119-126.
(Continued)

*Primary Examiner* — Cesar Paula
*Assistant Examiner* — Konrad Kulikowski
(74) *Attorney, Agent, or Firm* — Patent Law Works LLP (57) ABSTRACT

Methods and apparatus are described for scoring documents in response, in part, to parameters related to the document, source, and/or cluster score. Methods and apparatus are also described for scoring a cluster in response, in part, to parameters related to documents within the cluster and/or sources corresponding to the documents within the cluster. In one embodiment, the invention may identify the source; detect a plurality of documents published by the source; analyze the plurality of documents with respect to at least one parameter, and determine a source score for the source in response, in part, to the parameter. In another embodiment, the invention may identify a topic; identify a plurality of clusters in response to the topic; analyze at least one parameter corresponding to each of the plurality of clusters; and calculate a cluster score for each of the plurality of clusters in response, in part, to the parameter.

21 Claims, 10 Drawing Sheets

Related U.S. Application Data continuation of application No. 12/344,153, filed on Dec. 24, 2008, now Pat. No. 8,225,190, which is a continuation of application No. 10/611,269, filed on Jun. 30, 2003, now Pat. No. 7,568,148.

(60) Provisional application No. 60/412,287, filed on Sep. 20, 2002.

(56) References Cited

U.S. PATENT DOCUMENTS

| | | | |
|---|---|---|---|
| 5,787,420 | A | 7/1998 | Tukey et al. |
| 5,835,905 | A | 11/1998 | Pirelli et al. |
| 5,873,084 | A | 2/1999 | Bracho et al. |
| 5,907,836 | A | 5/1999 | Sumita et al. |
| 5,930,798 | A | 7/1999 | Lawler et al. |
| 5,937,160 | A | 8/1999 | Davis et al. |
| 6,026,388 | A | 2/2000 | Liddy et al. |
| 6,098,195 | A | 8/2000 | Northcott |
| 6,112,203 | A * | 8/2000 | Bharat ............ G06F 17/218 |
| 6,119,124 | A | 9/2000 | Broder et al. |
| 6,226,648 | B1 | 5/2001 | Appleman et al. |
| 6,275,820 | B1 | 8/2001 | Navin-Chandra et al. |
| 6,446,061 | B1 | 9/2002 | Doerre et al. |
| 6,453,315 | B1 | 9/2002 | Weissman et al. |
| 6,463,265 | B1 | 10/2002 | Cohen et al. |
| 6,558,431 | B1 | 5/2003 | Lynch et al. |
| 6,594,654 | B1 | 7/2003 | Salam et al. |
| 6,601,075 | B1 | 7/2003 | Huang et al. |
| 6,647,383 | B1 | 11/2003 | August et al. |
| 6,654,742 | B1 * | 11/2003 | Kobayashi ........ G06F 17/3061 |
| 6,785,671 | B1 | 8/2004 | Bailey et al. |
| 6,804,688 | B2 | 10/2004 | Kobayashi et al. |
| 6,850,934 | B2 | 2/2005 | Bates et al. |
| 6,859,800 | B1 | 2/2005 | Roche et al. |
| 6,920,450 | B2 | 7/2005 | Aono et al. |
| 6,952,806 | B1 | 10/2005 | Card et al. |
| 6,968,372 | B1 | 11/2005 | Thompson et al. |
| 6,978,267 | B2 | 12/2005 | Perisic et al. |
| 6,978,419 | B1 | 12/2005 | Kantrowitz |
| 7,080,079 | B2 | 7/2006 | Yu |
| 7,200,606 | B2 | 4/2007 | Elkan |
| 7,395,222 | B1 | 7/2008 | Sotos |
| 7,451,388 | B1 | 11/2008 | Henzinger et al. |
| 7,568,148 | B1 | 7/2009 | Bharat et al. |
| 7,577,654 | B2 | 8/2009 | Brants et al. |
| 7,577,655 | B2 | 8/2009 | Curtiss et al. |
| 8,090,717 | B1 | 1/2012 | Bharat |
| 8,126,876 | B2 | 2/2012 | Curtiss et al. |
| 8,225,190 | B1 | 7/2012 | Bharat et al. |
| 8,332,382 | B2 | 12/2012 | Curtiss et al. |
| 8,645,368 | B2 | 2/2014 | Curtiss et al. |
| 8,843,479 | B1 | 9/2014 | Bharat et al. |
| 2001/0003823 | A1 | 6/2001 | Mighdoll et al. |
| 2002/0011988 | A1 | 1/2002 | Sai et al. |
| 2002/0032772 | A1 * | 3/2002 | Olstad ............ G06F 17/30864 709/224 |
| 2002/0038430 | A1 | 3/2002 | Edwards et al. |
| 2002/0058550 | A1 | 5/2002 | Pace et al. |
| 2002/0073161 | A1 | 6/2002 | Yamazaki et al. |
| 2002/0073188 | A1 | 6/2002 | Rawson, III |
| 2002/0078035 | A1 | 6/2002 | Frank et al. |
| 2002/0103775 | A1 | 8/2002 | Quass et al. |
| 2002/0120629 | A1 | 8/2002 | Leonard |
| 2003/0009496 | A1 | 1/2003 | McBrearty et al. |
| 2003/0014383 | A1 | 1/2003 | Cho et al. |
| 2003/0061214 | A1 | 3/2003 | Alpha |
| 2003/0088554 | A1 | 5/2003 | Ryan et al. |
| 2003/0120654 | A1 | 6/2003 | Edlund et al. |
| 2003/0182270 | A1 | 9/2003 | Kuno et al. |
| 2003/0182310 | A1 | 9/2003 | Charnock et al. |
| 2003/0212704 | A1 | 11/2003 | Turicchi et al. |
| 2003/0220913 | A1 | 11/2003 | Doganata et al. |
| 2004/0010485 | A1 | 1/2004 | Aono et al. |
| 2004/0019846 | A1 | 1/2004 | Castellani et al. |
| 2005/0027699 | A1 | 2/2005 | Awadallah et al. |
| 2005/0102130 | A1 | 5/2005 | Quirk et al. |
| 2005/0203970 | A1 | 9/2005 | McKeown et al. |
| 2005/0216443 | A1 | 9/2005 | Morton et al. |
| 2005/0289140 | A1 | 12/2005 | Ford et al. |
| 2006/0089947 | A1 | 4/2006 | Gallivan et al. |
| 2006/0190354 | A1 | 8/2006 | Meisel et al. |
| 2006/0253418 | A1 | 11/2006 | Charnock et al. |
| 2006/0259476 | A1 | 11/2006 | Kadayam et al. |
| 2006/0277175 | A1 | 12/2006 | Jiang et al. |
| 2007/0022374 | A1 | 1/2007 | Huang et al. |
| 2008/0270393 | A1 | 10/2008 | Doganata et al. |

FOREIGN PATENT DOCUMENTS

| | | |
|---|---|---|
| JP | 10-171819 | 6/1998 |
| JP | 2002092001 | 3/2002 |
| JP | 2003248691 | 9/2003 |
| WO | WO0077689 | 12/2000 |
| WO | WO0146870 | 6/2001 |

OTHER PUBLICATIONS

Jokela taL "The Role of Structured Content in a Personalized News Service", 2001, Proceedings of the 34th Hawaii International Conference on System Sciences 2001. page 1-10.

M. Henzinger et al. "Query-Fee News Search", ACM, May 20-24, 2003 p. 1-10.

L. Egghe et al., "The Influence of Publication Delays on the Observed Aging Distribution of Scientific Literature", 2000, Jornal of the American Society of Information Science, p. 158-165.

Y. Rasolofo el al., "Result merging strategies for a current news metasearcher," Information Processing and Management, Elsevier Science Publishers, vol. 39, No. 4, Jul. 2003, 29 pages.

Zhang et al.. "A novel Web usage mining approach for search engines," Computer Networks, Elsevier Science Publishers, vol. 39, No. 3 Jun 21, 2002, 8 pages.

Meghabghab, "Stochastic Simulations of Rejected World Wide Web Pages," Proceedings of the 8" Internationa Symposium on Modeling, Analysis and simulation of Computer and Telecommunication Systems, Aug. 29-Sep. 1, 2000, p. 483-491.

PCT International Search Report for PCT/US2004/030028, dated Feb. 4, 2005 4 pages.

Tomlin, "A New Paradigm for Ranking Pages on the World Wide Web," May 20-24, 2003, 6 pages.

Office Action from U.S. Appl. No. 12/501,256, dated Sep. 21, 2010, 11 pages.

Office Action from U.S. Appl. No. 12/501,256 dated Mar. 15, 2011, 24 pages.

Protest of James Stakelum dated May 7, 2005, 9 pages.

Sakano, "Revealing the Secrets of [Google wa hitto suru] Dissecting the Search Engine," Internet Magazine, No. 79, Japan, Impress Corporation, Aug. 1, 2001, p. 222-235. (Includes partial English translation).

Harada, "Ranking of Search Results in a Search Engine," Bit vol. 32, No. 8, Japan, Kyosan Publishing, Aug. 1, 2000, p. 8-14. (Includes partial English translation).

Suzuki, "Latest State of Web Search Engines," Web+DB Press, vol. 5, First Publication, Japan, Gijutsu Hyoronsha, Nov. 15, 2001 p. 108-114. (Includes partial English translation).

Takeda, "Site-Outlining-Internet Information Gathering and Visualization Technology," Information Processing Society if Japan, Fourth vol. No. 8, Aug. 15, 2001, p. 781-786. (Includes partial English translation).

Johnson et al, "Information Retrieval from Unsegmented Broadcast News Audio," SpringerLink Contemporary, Jul. 2001, p. 251-268.

Office Action from U.S. Appl. No. 10/611,267, dated Oct. 26, 2010, 50 pages.

Chen et al., "Computing and Using Reputations for Internet Ratings", ACM, (2001) p. 154-162.

(56) References Cited

OTHER PUBLICATIONS

Zhang et al., "An efficient algorithm to rank Web resources" Computer Networks, Elsevier Science Publishers, vol. 33, No. 1-6, Jun. 2000, 7 pages.

* cited by examiner

| 760 | 765 | 770 | 775 | 780 |

METHODS AND APPARATUS FOR CLUSTERING NEWS ONLINE CONTENT BASED ON CONTENT FRESHNESS AND QUALITY OF CONTENT SOURCE

CROSS-REFERENCE TO RELATED APPLICATIONS

The application is a continuation of, and claims priority to U.S. application Ser. No. 13/548,930, titled "Methods and Apparatus for Clustering News Online Content Based on Content Freshness and Quality of Content Source," filed on Jul. 13, 2012, which is a continuation of, and claims priority to U.S. patent application Ser. No. 12/344,153, titled "Methods and Apparatus for Clustering News Content," filed on Dec. 24, 2008, now U.S. Pat. No. 8,225,190, which is a continuation of, and claims priority to U.S. patent application Ser. No. 10/611,269, titled "Methods and Apparatus for Clustering News Content," filed on Jun. 30, 2003, now U.S. Pat. No. 7,568,148 which claims priority, under 35 U.S.C. § 119(e), to U.S. Provisional Patent Application No. 60/412,287, entitled "Methods and Apparatus for Clustered Aggregation of News Content," filed Sep. 20, 2002, all of each of which is incorporated by reference in their entirety.

FIELD OF THE INVENTION

The present invention related generally to clustering content and, more particularly, to clustering content based on relevance.

BACKGROUND

There are many sources throughout the world that generate documents that contain content. These documents may include breaking news, human interest stories, sports news, scientific news, business news, and the like. The Internet provides users all over the world with virtually unlimited amounts of information in the form of articles or documents. With the growing popularity of the Internet, sources such as newspapers and magazines which have historically published documents on paper media are publishing documents electronically through the Internet. There are numerous documents made available through the Internet. Often times, there is more information on a given topic than a typical reader can process.

For a given topic, there are typically numerous documents written by a variety of sources. To get a well-rounded view on a given topic, users often find it desirable to read documents from a variety of sources. By reading documents from different sources, the user may obtain multiple perspectives about the topic.

However, with the avalanche of documents written and available on a specific topic, the user may be overwhelmed by the shear volume of documents. Further, a variety of factors can help determine the value of a specific document to the user. Some documents on the same topic may be duplicates, outdated, or very cursory. Without help, the user may not find a well-balanced cross section of documents for the desired topic.

A user who is interested in documents related to a specific topic typically has a finite amount of time locate such documents. The amount of time available spent locating documents may depend on scheduling constraints, loss of interest, and the like. Many documents on a specific topic which may be very valuable to the user may be overlooked or lost because of the numerous documents that the user must search through and the time limitations for locating these documents.

It would be useful, therefore, to have methods and apparatus for clustering content.

SUMMARY OF THE INVENTION

Methods and apparatus are described for scoring documents in response, in part, to parameters related to the document, source, and/or cluster score. Methods and apparatus are also described for scoring a cluster in response, in part, to parameters related to documents within the cluster and/or sources corresponding to the documents within the cluster. In one embodiment, the invention may identify the source; detect a plurality of documents published by the source; analyze the plurality of documents with respect to at least one parameter; and determine a source score for the source in response, in part, to the parameter. In another embodiment, the invention may identify a topic; identify a plurality of clusters in response to the topic; analyze at least one parameter corresponding to each of the plurality of clusters; and calculate a cluster score for each of the plurality of clusters in response, in part, to the parameter.

Additional aspects of the present invention are directed to computer systems and to computer-readable media having features relating to the foregoing aspects.

BRIEF DESCRIPTION OF THE DRAWINGS

The accompanying drawings, which are incorporated in and constitute a part of this specification, illustrate one embodiment of the invention and, together with the description, explain one embodiment of the invention. In the drawings.

DETAILED DESCRIPTION

The following detailed description of the invention refers to the accompanying drawings. The detailed description does not limit the invention. Instead, the scope of the invention is defined by the appended claims and equivalents.

The present invention includes methods and apparatus for creating clusters. The present invention also includes methods and apparatus for ranking clusters. Those skilled in the art will recognize that many other implementations are possible, consistent with the present Invention.

The term "document" may include any machine-readable or machine-storable work product. A document may be a file, a combination of files, one or more files with embedded links to other files. These files may be of any type, such as text, audio, image, video, and the like. Further, these files may be formatted in a variety of configurations such as text, HTML, Adobe's portable document format (PDF), email, XML, and the like.

In the context of traditional publications, a common document is an article such as a news article, a human-interest article, and the like. In the context of the Internet, a common document is a Web page. Web pages often include content and may include embedded information such as meta information, hyperlinks, and the like. Web pages also may include embedded instructions such as Javascript. In many cases, a document has a unique, addressable, storage location and can therefore be uniquely identified by this addressable location. A universal resource locator (URL) is a unique address used to access information on the Internet.

For the sake of simplicity and clarity, the term "source" refers to an entity that has published a corresponding document.

Environment and Architecture

Figure 1:
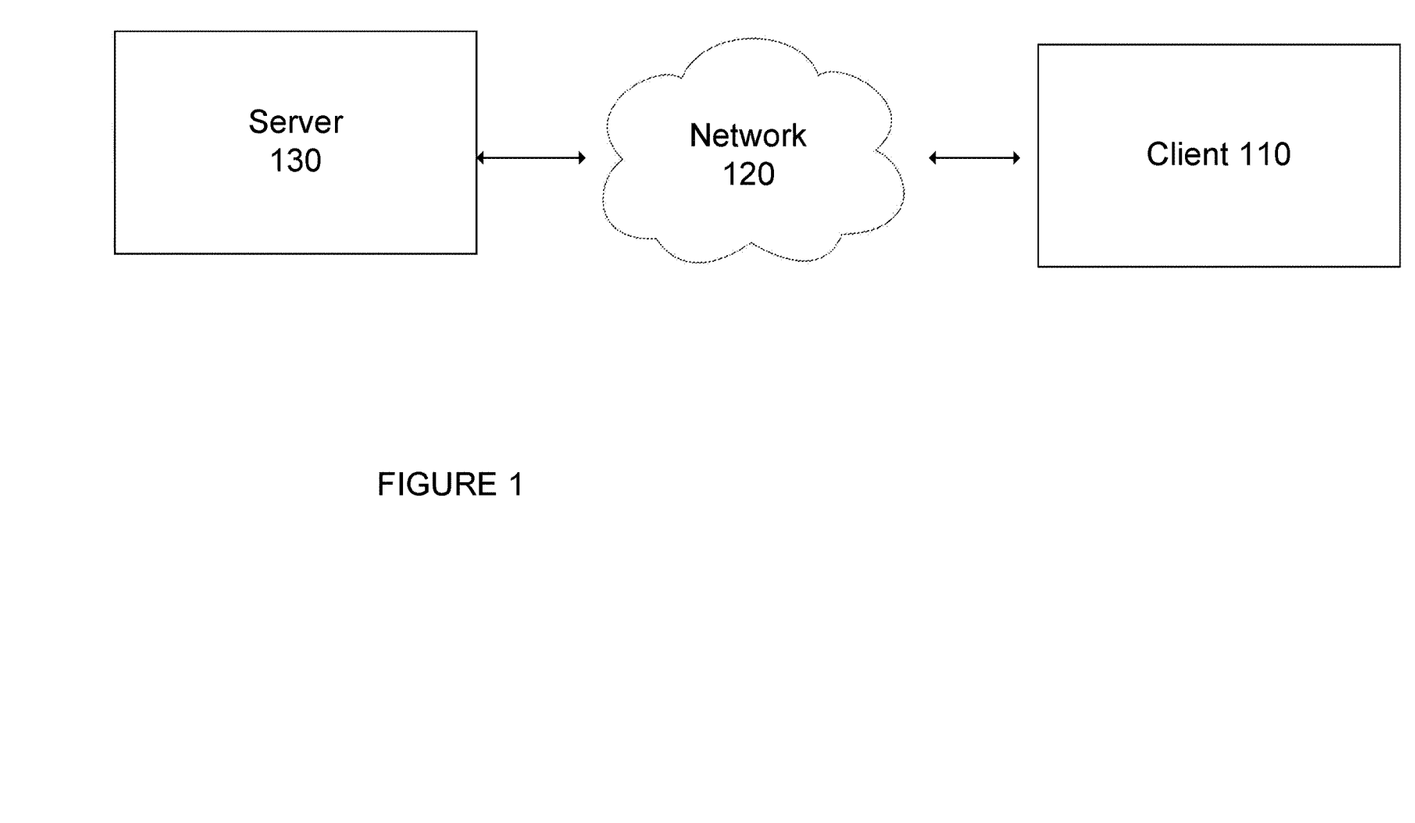
FIG. 1 is a diagram illustrating an environment within which the invention may be implemented.

FIG. 1 is a diagram illustrating an environment within which the invention may be implemented. The environment includes a client 110, a network 120, and a server 130.

The client 110 may be utilized by a user that submits a query to the server 130 and a user that retrieves information in response to the query. In one embodiment, the information includes documents which may be viewable by the user through the client 110. In one embodiment, the information is organized within clusters which are ranked, sorted, and optimized to provide useful information to the user. The factors that are utilized to analyze each cluster may include the recency of the document, the source of the document, the importance of the content within the document, and the like.

In one embodiment, the client 110 may be a web browser, and the server 130 includes a clustering system.

The network 120 may function as a conduit for transmissions between the client 110 and the server 130. In one embodiment, the network 120 is the Internet. In another embodiment, the network 120 may be any type of transmission means.

The server 130 interfaces with the client 110 through the network 120. The clustering system may be within the server 130. The clustering system may include additional elements. In one embodiment, the clustering system performs a variety of functions such as analyzing clusters and documents within clusters which are explained in more detail below and shown in reference to FIGS. 3 through 9.

Figure 2:
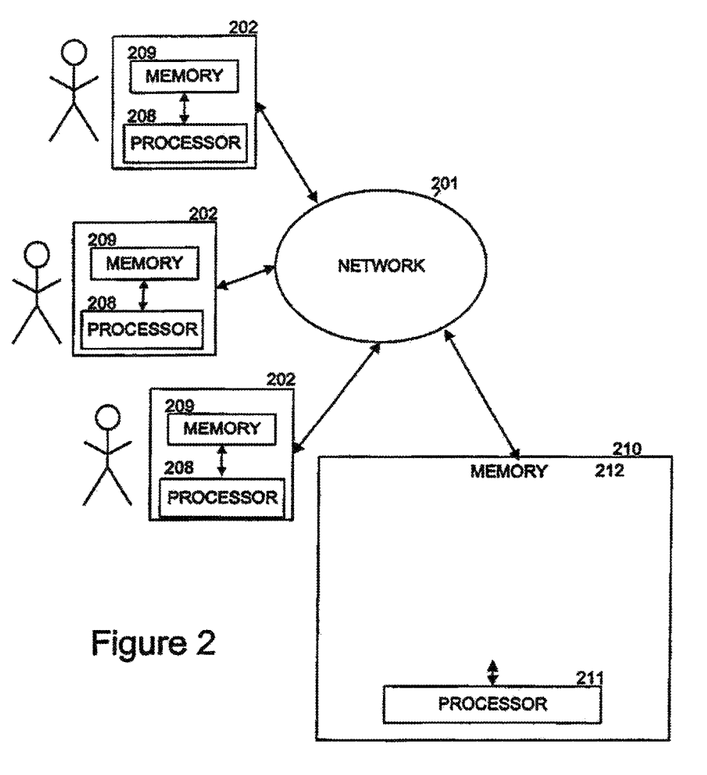
FIG. 2 is a simplified block diagram illustrating one embodiment in which the invention may be implemented.

FIG. 2 is a simplified diagram illustrating an exemplary architecture in which the present invention may be implemented. The exemplary architecture includes a plurality of web browsers 202, a server device 210, and a network 201. In one embodiment, the network 201 may be the Internet. The plurality of web browsers 202 are each configured to include a computer-readable medium 209, such as random access memory, coupled to a processor 208. Processor 208 executes program instructions stored in the computer-readable medium 209. In another embodiment, the plurality of web browsers 202 may also include a number of additional external or internal devices, such as, without limitation, a mouse, a CD-ROM, a keyboard, and a display.

Similar to the plurality of web browsers 202, the server device 210 may include a processor 211 coupled to a computer-readable medium 212. The server device 210 may also include a number of additional external or internal devices, such as, without limitation, a secondary storage element, such as database 240.

The plurality of target processors 208 and the server processor 211 can be any of a number of well known computer processors, such as processors from Intel Corporation, of Santa Clara, Calif. In general, the plurality of web browsers 202 may be any type of computing platform connected to a network and that interacts with application programs, such as a personal computer, a mobile lap top, a personal digital assistant, a "smart" cellular telephone, or a pager. The server 210, although depicted as a single computer system, may be implemented as a network of computer processors.

The plurality of web browsers 202 and the server 210 may include the clustering system as embodied within the server 130 (FIG. 1). In one embodiment, the plurality of computer-readable medium 209 and 212 may contain, in part, portions of the clustering system. Additionally, the plurality of web browsers 202 and the server 210 are configured to send and receive information for use with the clustering system. Similarly, the network 201 is configured to transmit information for use with the clustering system.

Operation

Figure 3:
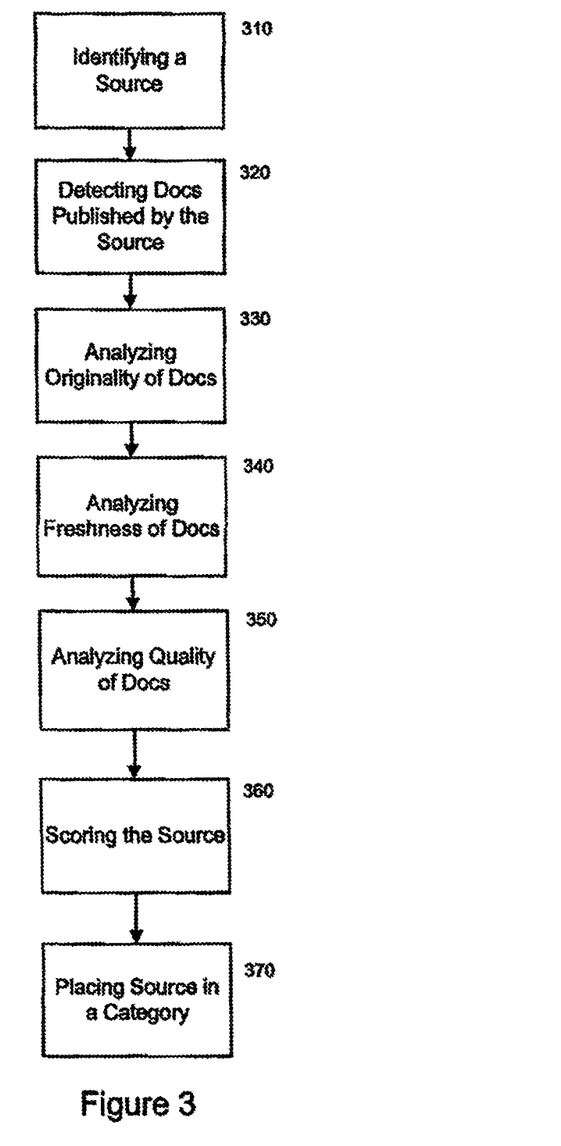
FIG. 3 is a flow diagram for ranking sources, consistent with one embodiment of the invention.
Figure 5:
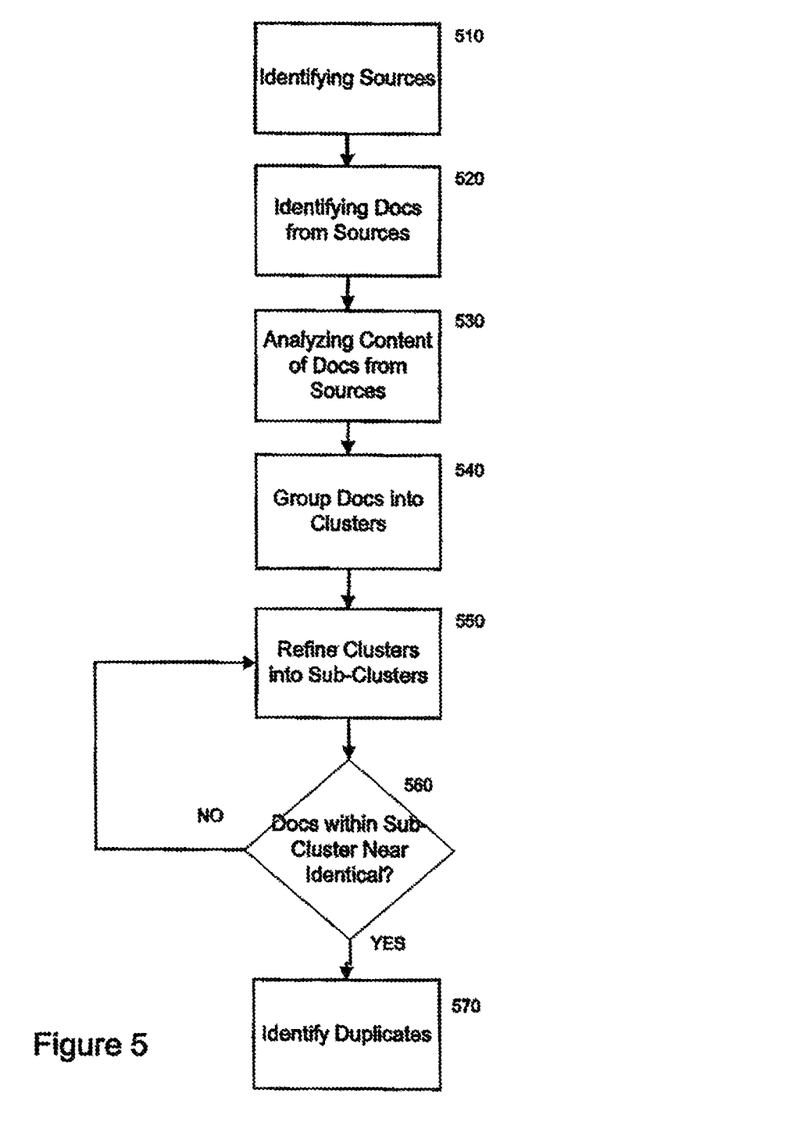
FIG. 5 is a flow diagram for defining clusters and sub-clusters, consistent with one embodiment of the invention.

The flow diagrams as depicted in FIGS. 3, 5, 7 A, 8, and 9 illustrate one embodiment of the invention. In each embodiment, the flow diagrams illustrate one aspect of processing documents and/or sources of documents using the clustering system.

The blocks within the flow diagram may be performed in a different sequence without departing from the spirit of the invention. Further, blocks may be deleted, added, or combined without departing from the spirit of the invention.

A large number of documents may be electronically available for any particular topic through the Internet. The quality of these documents can range from top quality journalism to unreliable reporting. The source of a document may predict the quality of the particular document For example, a highly regarded source may, on average, publish higher quality documents compared to documents published by a less highly regarded source.

The flow diagram in FIG. 3 illustrates one embodiment for ranking sources. In Block 310, a specific source is identified.

In Block 320, documents which are published by the specific source are detected. In one embodiment, the detection of these documents published by a specific source may be limited to documents published within the last month. In other embodiment, these documents may include all documents published by the specific source.

In Block 330, the Originality of the documents are analyzed. In one embodiment, duplicate documents which are published by the same source are removed. For example, duplicate documents which are published more than once by the same source are removed so that only the original document remains. Duplicate documents may be found by comparing the text of the documents published by the source. If the text of both documents are a close match, then one of the documents may be considered a duplicate.

In another example, non-original documents which are re-published by different sources are removed. For example, many news wire services such as Associated Press and Reuters carry original documents which are re-published by other sources. These non-original documents that are re-published may be found by comparing the text of the document re-published by one source and the text of the original document published by a different source. If both documents are a close match, the original document may be determined by finding the document with the earliest publication date. For example, the first source to publish identical documents may be considered the original author, and the corresponding document is considered the canonical version with the remaining subsequent versions considered duplicates.

To facilitate an efficient textual analysis of comparing the documents published by the source with documents from other sources, the documents from other sources may be limited to those which have been published within a given length of time such as within the last month.

In Block 340, the documents are analyzed for freshness. In one embodiment, freshness may be measured by a combination of the frequency in which the source generates new content and the speed in which a document is published after the corresponding event has occurred. For example, freshness of a source can be measured by the number of canonical documents generated by the source over the course of X number of days. The freshness of a source can also be measured by an average lapse in time between an event and the publication of a document regarding the event.

Several schemes may be utilized to identify which documents are examined for freshness in the Block 340. For example, the canonical documents from the Block 330 are analyzed for freshness. In another example, all the documents including both canonical and duplicates as identified in the Block 320 are analyzed for freshness.

In Block 350, the documents are analyzed for overall quality. There are multiple ways to analyze the document for overall quality. For example, the overall quality of the documents by the source may be judged directly by humans. In another example, the overall quality of the documents may be indirectly assessed by utilizing circulation statistics of the source.

In another example, the overall quality of the documents may also be assessed by utilizing the number hit or views the documents received within an arbitrary time frame. In yet another example, the overall quality of the documents may also be assessed by measuring the number of links pointing to the documents published by the source.

In Block 360, the source is scored based on multiple factors such as the number of documents published, the originality of the documents, the freshness of the documents, and the quality of the documents. In one embodiment, the factors such as number of documents, originality, freshness, and quality may be weighted according the desired importance of these factors.

For example, the score of the source is stored as part of a database. The database may be located within the server 210 or accessible to the server 210 over the network 201.

Figure 4:
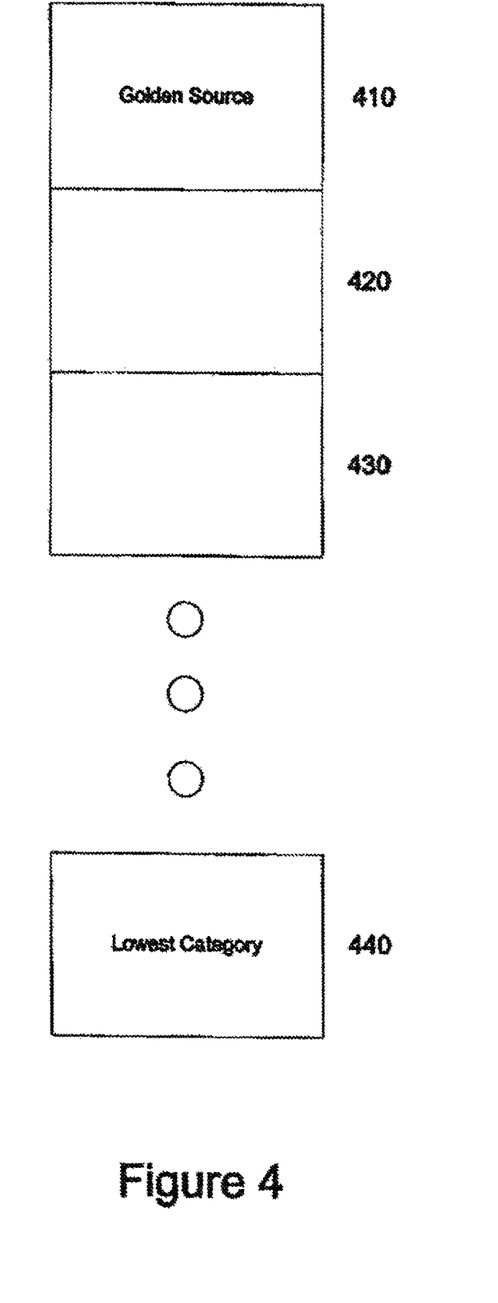
FIG. 4 is a simplified diagram illustrating multiple categories for sources, consistent with one embodiment of the invention.

In Block 370, the source is categorized in response, at least in part, to the score from the Block 360. In one embodiment, the source may be placed into any number categories. For example, FIG. 4 illustrates categories 410, 420, 430, and 440 for exemplary purposes. Any number of categories may be utilized to illustrate the different levels of sources. The category 410 is shown as the golden source level; the category 440 is shown as the lowest level; and the categories 420 and 430 are shown as intermediate levels. In one embodiment, the threshold for sources achieving the category 410 (golden source level) is targeted for sources that carry a substantial number of canonical documents. In one embodiment, between 5% to 10% of all sources are targeted to fall within the golden source level. Other targets and levels may be utilized without departing form the invention.

The categorization of the source in the Block 370 may be stored as part of a database. The database may be located within the server 210 or accessible to the server 210 over the network 201.

The flow diagram in FIG. 5 illustrates one embodiment of defining clusters, sub-clusters, and documents within the clusters and sub-clusters.

In Block 510, a plurality of sources are identified. For example, the clustering system 130 may detect the plurality of sources from one or more categories illustrated within FIG. 4. These sources may be limited to sources associated with specific categories such as "golden sources".

In Block 520, documents published by the plurality of sources, as defined in the Block 510, are Identified. For illustrative purposes, documents 610, 620, 630, 640, and 650 (FIG. 6) represent exemplary documents published by the plurality of sources.

In Block 530, the documents identified in the Block 520 are analyzed for their content. For example, a topic or subject matter may be extrapolated from the analysis of the content from each of these documents.

Each document may contain a document vector which describes the topic or subject matter of the document. For example, the document vector may also contain a key term which characterizes the topic or subject matter of the document.

In Block 540, the documents identified in the Block 520 are grouped into one or more clusters. In one example, the documents may be clustered using a text clustering technique such as hierarchical agglomerative cluster. In another example, various other clustering techniques may be utilized.

The documents may be clustered by measuring the distance between the documents. For example, the document vector for each document maybe utilized to measure the similarity between the respective documents. A common information retrieval (IR) technique such as term frequency and inverse document frequency (TFIDF) may be utilized to match document vectors.

Various properties of the document vectors and key terms may aid in measuring the distance between each document. For example, the document vectors and key terms which are identified as titles, initial sentences, and words that are "named entities" may have increased importance and may be given increased weighting for measuring the similarities between documents. Named entities typically denote a name of a person, place, event, and/or organization. Named entities may provide additional value, because they are typically mentioned in a consistent manner for a particular event regardless of the style, opinion, and locality of the source.

Figure 6:
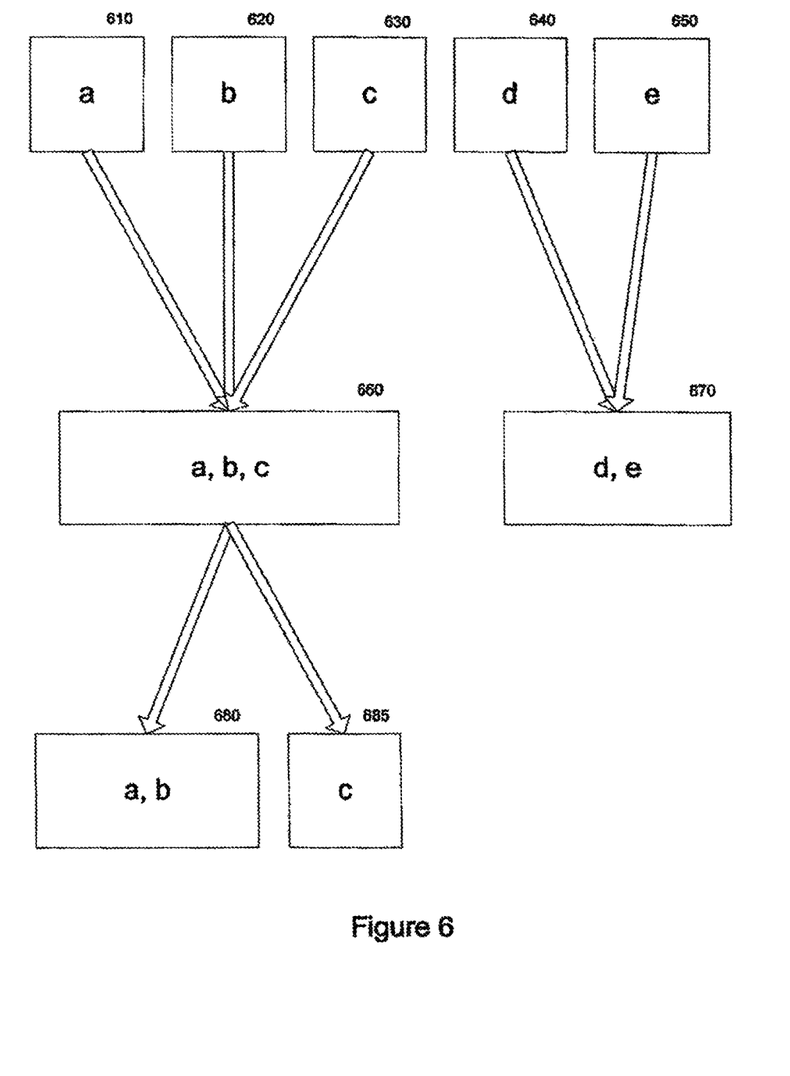
FIG. 6 is a simplified diagram illustrating exemplary documents, clusters, and sub-clusters, consistent with one embodiment of the invention.

For illustrative purposes, the documents 610, 620, and 630 are shown grouped together in a cluster 660 in FIG. 6. Similarly, the documents 640 and 650 are shown grouped together in a cluster 670 in FIG. 6. In this example, the documents 610, 620, and 630 are determined to have more similarities than the documents 640 and 650.

In Block 550, the documents within the clusters which were formed in Block 540 may be further refined into sub-clusters. The documents within a cluster may be further analyzed and compared such that sub-clusters originating from the cluster may contain documents which are even more closely related to each other. For example, depending on the particular cluster, each cluster may be refined into sub-clusters. Additionally, the sub-cluster may contain a sub-set of documents which are included in the corresponding cluster, and the documents within the sub-cluster may have greater similarities than the documents within the corresponding cluster.

For example, the cluster 660 includes documents 610, 620, and 630 as shown in FIG. 6. The cluster 660 is further refined into sub-clusters 680 and 685. The sub-cluster 680 includes the documents 610 and 620. In this example, the documents 610 and 620 within the sub-cluster 680 are more closely related to each other than the document 630 which is isolated in a different sub-cluster 685.

The comparison of document vectors and key terms and other techniques as discussed in association with the Block 540 may be utilized to determine sub-clusters.

In Block 560, the documents within a sub-cluster are checked for their level of similarity. If there are multiple documents within the sub-cluster, and the documents are not identical enough, then the documents within the sub-cluster may be further refined and may be formed into lower level sub-clusters in Block 550. When sub-clusters are formed into lower level sub-clusters, a stricter threshold is utilized to group sets of identical or near identical documents into these lower level sub-clusters.

For the sake of clarity, lower level sub-clusters are not shown in FIG. 6. However, forming lower level sub-clusters from a sub-cluster is analogous to forming the sub-clusters 680 and 685 from the cluster 660.

If there are multiple documents within the sub-cluster, and the documents are identical enough, then the canonical document is identified by the earliest publication time and the remaining documents may be considered duplicates in Block 570.

Figure 7:
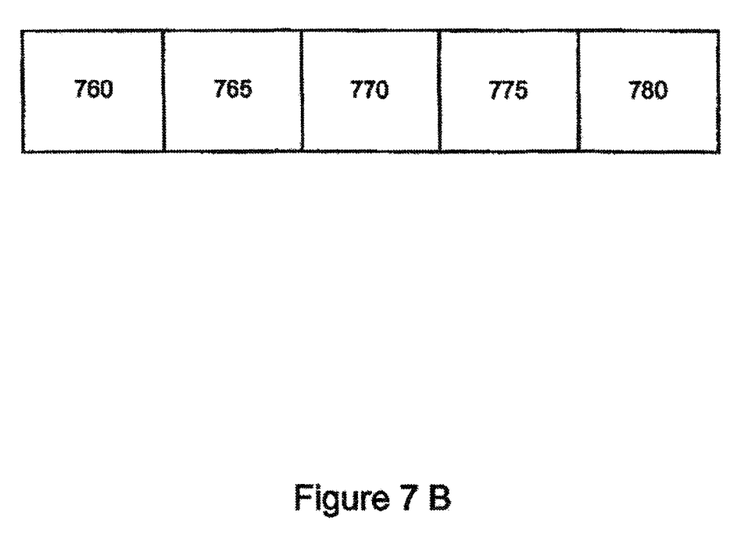
FIG. 7A is a flow diagram for scoring clusters, consistent with one embodiment of the invention.
FIG. 7B is a simplified block diagram illustrating one embodiment in which the invention may be implemented.
Figure 7A:
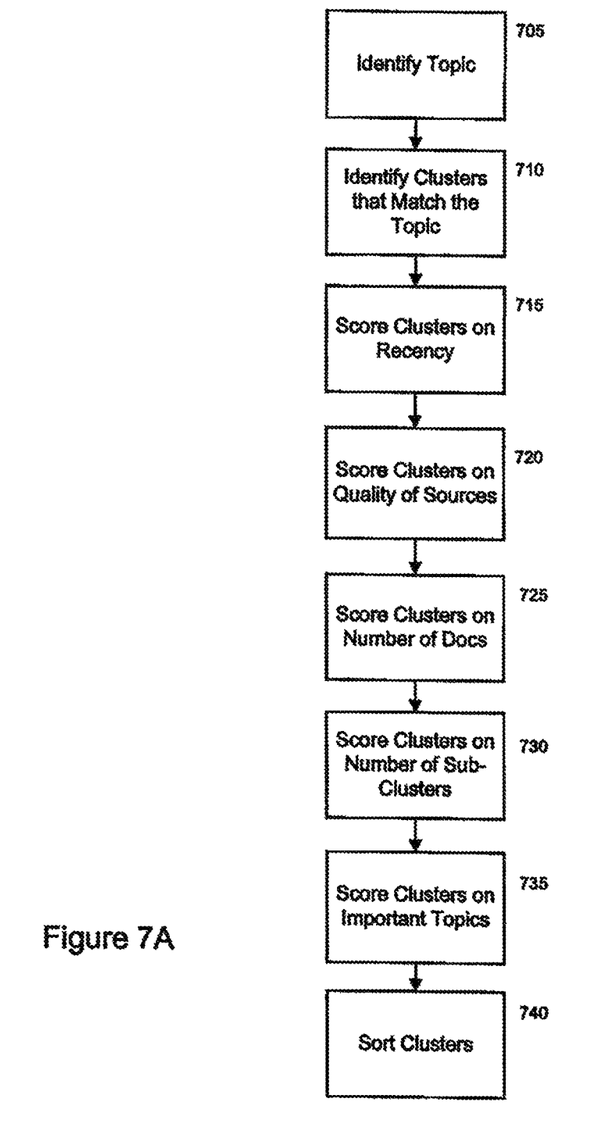

The flow diagram in FIG. 7A illustrates one embodiment of scoring clusters. In Block 705, a topic is identified. In one embodiment, the topic is customized to a user. For example, the topic may be in the form of a query of key word(s) initiated by the user. The topic may also be identified from a personalized page belonging to the user. The topic may also be selected from a generic web page which allows users to select different topic categories of interest.

In Block 710, clusters that are matched to the topic are identified. For example, clusters which are similar to the topic may be identified.

The identified clusters may be scored on various factors within the Blocks 715, 720, 725, 730, and 735. In Block 715, these clusters are scored based on the recency of canonical documents within each cluster. For example, a cluster with the most recent canonical documents may be scored higher than other clusters.

The recency of canonical documents may be computed for the cluster by using a weighted sum over the original documents within the cluster. In one example, a weighting scheme is utilized where a higher weight is given for fresher and more recent document.

In one embodiment, each document within a cluster may be sorted and assigned a bin that corresponds with the age of the document. Each bin is configured to accept documents within a time range and corresponds with a specific weighting factor. The specific weighting factor corresponds with the time range of the documents within the bin. In one embodiment, the weighting factor increases as the time range corresponds with more recent documents.

FIG. 7B illustrates the use of bins relative to the weighted sum in computing the recency of coverage. Bins 760, 765, 770, 775, and 780 are shown for exemplary purposes. Additional or fever bins may be utilized without departing from the scope of the invention.

For example, the bin 760 may have a time range which includes documents that have aged less than 60 minutes. In this example, the documents within the bin 760 are assigned a weighting factor of 24. The bin 765 may have a time range which includes documents that have aged more than 60 minutes and less than 2 hours. In this example, the documents within the bin 765 are assigned a weighting factor of 20. The bin 770 may have a time range which includes documents that have aged more than 2 hours and less than 4 hours. In this example, the documents within the bin 770 are assigned a weighting factor of 15. The bin 775 may have a time range which includes documents that have aged more than 4 hours and less than 24 hours. In this example, the documents within the bin 775 are assigned a weighting factor of 3. The bin 780 may have a time range which includes documents that have aged more than 24 hours. In this example, the documents within the bin 780 are assigned a weighting factor of −1.

Different weighting factors and time ranges may be utilized without departing from the scope of the invention.

In use, the cluster score may be calculated, in part, by multiplying the number of documents within each bin with the corresponding weighting factor and summing the results from each of these multiplications. For example, a cluster contains documents with the following distribution of documents: bin 760 contains 2 documents, bin 765 contains 0 documents, bin 770 contains document, bin 775 contains 5 documents, and bin 780 contains 10 documents. A sample calculation for a cluster score, based on the sample weighting factors and document distribution as described above, is shown in Equation 1.

$$\text{sample cluster score} = 3 \times 24 + 0 \times 20 + 1 \times 15 + 5 \times 3 + 10 \times -1 \qquad \text{Equation 1}$$

In Block 720, the clusters may be scored based on the quality of the sources that contribute documents within each cluster. For example, the sources may be ranked on an absolute grade. According to this example, a well-known source such as the Wall Street Journal may be ranked higher than a local source such as the San Jose Mercury News regardless of the topic.

The importance of a source may also be computed based on the notoriety of the source. For example, the source may be computed based on the number of views or hits received by the source. In another example, the importance of a source may be computed based on the circulation statistics of the source. In yet another embodiment, the importance of the source may be based on the number of links for each of the documents published by the source and within the cluster.

In addition, the quality of the source may be based on the importance of the source relative to the particular topic. For example, with an document relating to a news story, sources such as CNN, New York Times, Los Angeles Times, and Reuters may be included with a top tier source category; sources such as XYZ News and Any City Times may be Included in a second tier source category; and sources such as local news organizations may be included in a third tier source category.

The importance of the source may depend, at least in part, on the subject matter of the particular document and may change with each unique topic. For example, with a query and associated documents relating to a local news story, the local news organizations where the event which is identified in the query is located may be included within the top tier source category. These local news organizations may typically be included within the third tier source category for a national even/story, however due to the local nature of the event related to the query, these local news organizations may be elevated to the top tier source category for this particular query based on geography.

The importance of the source may be proportional to the percentage of documents from the source which match the subject matter of the topic. For example, if the topic relates to the subject of "music", then a source which may be considered important is MTV, because the majority of MTV's prior documents are related to music. The importance of the sources may also change over a period of time for the same topic depending on the subject matter of the documents.

In Block 725, the clusters are scored based on the number of canonical documents contained within each cluster. For example, the cluster may be scored higher when there are more canonical documents within the cluster.

In Block 730, the clusters may be scored based on the number of sub-clusters within each cluster. For example, the number of sub-clusters within a cluster may be utilized to measure the amount of diversity of documents within the cluster.

In Block 735, the clusters may be scored based on a match between the subject of the cluster and a set of predetermined topics. For example, the set of predetermined topics are deemed as important topics such as world news, national news, and the like. A cluster may be scored higher when there is a match between the subject of the cluster and one of the set of predetermined topics.

In Block 740, each of the clusters may be scored according to parameters such as recency of documents, quality of sources, number of documents, number of sub-clusters, and important topics. In one embodiment, the score for each clusters may be calculated by adding up the scores attributed by the parameter analyzed in the Blocks 715, 720, 725, 730, and 735. In one embodiment, these scores may be stored within the database 140. In addition, the clusters are sorted by score.

Figure 8:
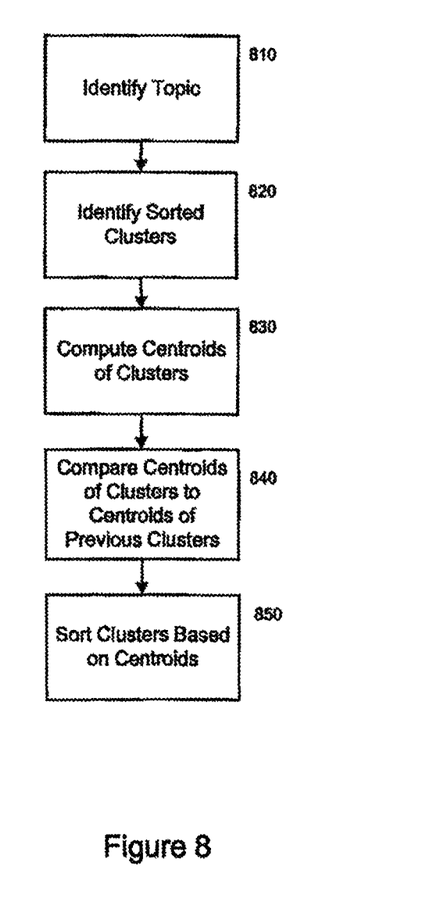
FIG. 8 is a flow diagram for sorting clusters, consistent with one embodiment of the invention.

The flow diagram in FIG. 8 illustrates one embodiment of sorting clusters. In Block 810, a topic Is identified. In one embodiment, the topic is customized to a user. For example, the topic may be in the form of a query of key word(s) initiated by the user. The topic may also be identified from a personalized page belonging to the user. The topic may also be selected from a generic web page which allows users to select different topic categories of interest.

In Block 820, clusters that are already sorted by the Block 780 are identified.

In Block 830, centroids may be computed for each cluster. Typically, the centroid uniquely describes the topic or subject matter of the cluster. In one example, the centroid is computed by averaging individual term vectors from the documents contained within the cluster. The term vectors may include a weighted set of terms.

In Block 840, the centroids of the sorted clusters may be compared with the centroids of previously viewed clusters. If the centroid of a particular cluster is similar to the centroids of the previously viewed clusters, this particular cluster may be rated lower than other sorted clusters which are not similar to the centroids of previously viewed clusters. The similar particular cluster may be rated lower than dissimilar sorted clusters, because the user has already viewed documents which are related to the similar particular cluster.

In Block 850, the clusters identified in the Block 820 may be sorted based on the comparison between the centroids of these clusters and the centroids of previously viewed clusters.

Figure 9:
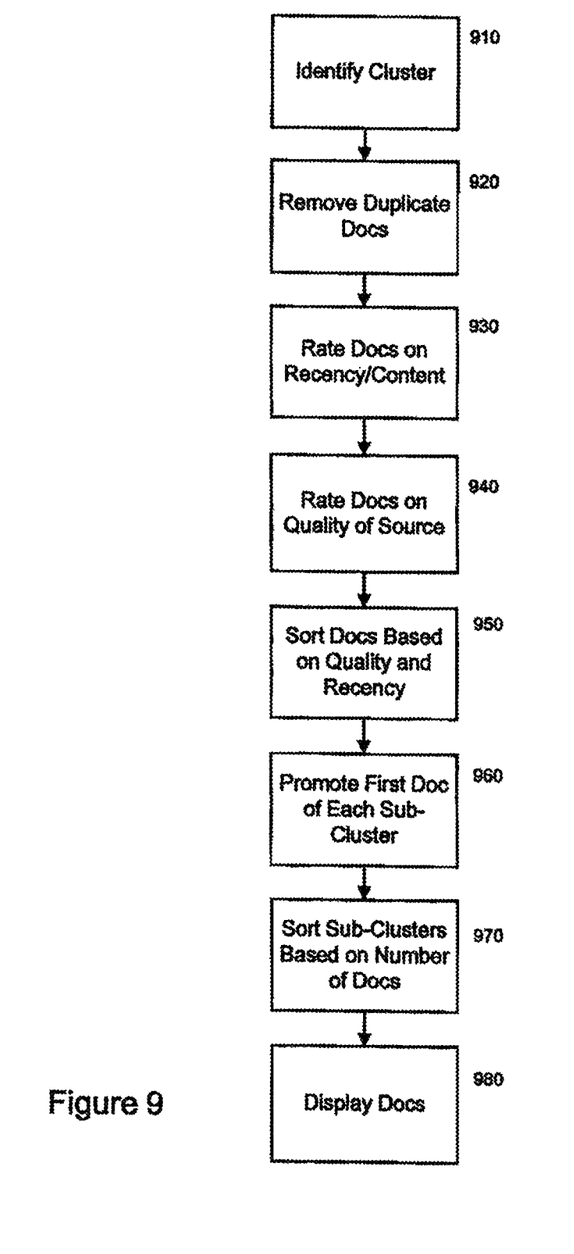
FIG. 9 is a flow diagram for ranking documents within a cluster, consistent with one embodiment of the invention.

The flow diagram in FIG. 9 illustrates one embodiment of ranking and displaying documents within a cluster. In Block 910, a cluster is identified. In Block 920, duplicate documents within the cluster may be removed. For example, canonical documents remain within the clusters.

In Block 930, the documents within the cluster may be rated for recency and/or content. With regards to recency for example, if a document is ten (10) hours old, the document is assigned a recency score of ten (10) hours. In assigning a recency score, the measurement of recency may be defined as the difference in time between the present time and the time of publication. In another embodiment, the measurement of recency may be defined as the difference in time between publication of the document and the time of a corresponding event. In yet another embodiment, the measurement of recency may be defined as the difference in time between the present time and the time of an event corresponding to the document.

In addition to recency, the documents may also be scored according to the length of a document the title of a document, and genre of a document For example, in one embodiment, the longer the document is, the higher the particular document may be scored.

The title of the document may be analyzed in a variety of ways to aide in scoring the document. For example, the length of the title may be utilized to score the document with a longer title scoring a higher score.

In another example, the title may be searched for generic terms such as "News Highlights", "News Summary", and the like. In one embodiment, the higher percentage of generic terms used with the title, the lower the document may be scored. By the same token, use of proper nouns in the title may increase the score of the document. In yet another example, the words within the title may be compared with the centroid of the cluster which contains the document. In one embodiment, the score of the document is higher if the title contains words that overlap or match the centroid of the cluster.

Based on the content of the document, the document may belong to a specific genre such as "op/ed", "investigative report", "letter to the editor", "news brief", "breaking news", "audio news", "video news", and the like. The score of the document may increase if the genre of the document matches the genre of a query. In one embodiment, the query specifies a particular genre. In another embodiment, the query includes the genre which passively specified by the user as a preference.

In Block 940, the documents within the cluster may be rated for quality of the corresponding source. Rating the quality of the corresponding source is demonstrated in the Block 350 (FIG. 3).

The measurement of recency for a document (as described in the Block 930) may be taken into account with the quality of the corresponding source.

For example, if a document is assigned a recency score of ten (10) hours and the corresponding source is considered a golden source, then a modified recency score is ten subtracted by X (10−X) hours where X is a selected value based on the quality of the source. In this example, the modified recency score is less than the original recency score, because the corresponding source is considered a golden source.

In another example, if a document is assigned a recency score often (10) hours and the corresponding source is considered a lowest category, then a modified recency score is ten added by Y (10+Y) hours where V is a selected value based on the quality of the source. In this example, the modified recency score is greater than the original recency score, because the corresponding source is considered a lowest category.

In Block 950, the documents may be sorted by recency of the document and quality of the source. The documents may be sorted by the modified recency score as shown in the Block 940. In one embodiment, the documents are sorted with the most recent documents listed first.

In Block 960, the most recent document within each sub-cluster of the cluster is identified and included as part of a displayed list of documents. The displayed list of documents utilizes an order with the most recent document listed first according to the modified recency score.

In Block 970, the documents within the displayed list of documents as described in the Block 960 are weighted by the number of documents within the corresponding sub-cluster. In one embodiment, the modified recency score is further modified. For example, the more documents within a particular sub-cluster may increase the importance of the documents within the sub-cluster. In other words, the individual documents within the displayed list of documents are weighted based on the number of documents within the sub-cluster.

In one example, a first and second document may each have a modified recency score of ten (10) hours. However, the first document is within a sub-cluster which includes twenty (20) documents, and the second document is within a sub-cluster which includes ten (10) documents. According to one embodiment, the first document has a new modified recency score of eight (8) hours based on the weighting of the number of documents within the sub-cluster.

The second document has a new modified recency score of twelve (12) hours based on the weighting of the number or documents within the sub-cluster. Accordingly, the first document has a lower modified recency score than the second document and may be in a higher priority position to be viewed or displayed.

In Block 980, the displayed list of documents is shown to the user. The documents within the displayed list of documents may be shown to the user based on the modified recency score as formed in the Block 960. The documents within the displayed list of documents may be shown to the user based on the modified recency score as modified in the Block 970.

CONCLUSION

The foregoing descriptions of specific embodiments of the invention have been presented for purposes of illustration and description. For example, the invention is described within the context of documents as merely one embodiment of the invention. The invention may be applied to a variety of other electronic data such as pictures, audio representations, graphic images, and the like.

For the sake of clarity, the foregoing references to "browser" are a figurative aid to illustrate a particular device which is utilized by a specific user.

They are not intended to be exhaustive or to limit the invention to the precise embodiments disclosed, and naturally many modifications and variations are possible in light of the above teaching. The embodiments were chosen and described in order to explain the principles of the invention and its practical application, to thereby enable others skilled in the art to best utilize the invention and various embodiments with various modifications as are suited to the particular use contemplated. It is intended that the scope of the invention be defined by the Claims appended hereto and their equivalents.

What is claimed:

1. A computer-implemented method comprising:
   identifying, by a processor, online documents published online by one or more sources;
   calculating, by the processor, a first score based on a measure of freshness of a first online document of the online documents, the measure of freshness being based on an amount of time between a first time when the first online document of the online documents was published and a second time when an event described by the first online document occurred;
   calculating, by the processor, a second score based on a quantity of the online documents that have a relationship to the first online document;
   ranking, by the processor, the first online document based on the first score and the second score; and
   providing, by the processor, the first online document for display based on the ranking of the first online document.

2. The computer-implemented method of claim 1, wherein a centroid is calculated for the quantity of the online documents, the centroid uniquely describing a subject matter of the quantity of the online documents.

3. The computer-implemented method of claim 2, wherein the second score is further based on whether a title of the first online document includes one or more words that match the centroid.

4. The computer-implemented method of claim 1, wherein the relationship includes a common relationship to a subject matter.

5. The computer-implemented method of claim 1, wherein the second score is further based on a number of views that the first online document received within a time frame.

6. The computer-implemented method of claim 1, wherein the second score is based on circulation statistics of a first source of the one or more sources, the first source having published the first online document.

7. The computer-implemented method of claim 1, wherein the online documents are each weighted for calculating the first score, the weighting based on a respective time when each of the online documents is published.

8. A system comprising:
   a processor; and
   a non-transitory computer readable medium storing instructions that, when executed by the processor, cause the processor to perform operations comprising:
   identifying online documents published online by one or more sources;
   calculating a first score based on a measure of freshness of a first online document of the online documents, the measure of freshness being based on an amount of time between a first time when the first online document of the online documents was published and a second time when an event described by the first online document occurred;
   calculating a second score based on a quantity of the online documents that have a relationship to the first online document;
   ranking the first online document based on the first score and the second score; and
   providing the first online document for display based on the ranking of the first online document.

9. The system of claim 8, wherein a centroid is calculated for the quantity of the online documents, the centroid uniquely describing a subject matter of the quantity of the online documents.

10. The system of claim 9, wherein the second score is further based on whether a title of the first online document includes one or more words that match the centroid.

11. The system of claim 8, wherein the relationship includes a common relationship to a subject matter.

12. The system of claim 8, wherein the second score is further based on a number of views that the first online document received within a time frame.

13. The system of claim 8, wherein the second score is based on circulation statistics of a first source of the one or more sources, the first source having published the first online document.

14. The system of claim 8, wherein the online documents are each weighted for calculating the first score, the weighting based on a respective time when each of the online documents is published.

15. A non-transitory computer-readable medium having computer executable instructions for performing a method comprising:

identifying, by a processor, online documents published online by one or more sources;

calculating, by the processor, a first score based on a measure of freshness of a first online document of the online documents, the measure of freshness being based on an amount of time between a first time when the first online document of the online documents was published and a second time when an event described by the first online document occurred:

calculating, by the processor, a second score based on a quantity of the online documents that have a relationship to the first online document;

ranking, by the processor, the first online document based on the first score and the second score; and providing, by the processor, the first online document for display based on the ranking of the first online document.

16. The non-transitory computer-readable medium of claim 15, wherein a centroid is calculated for the quantity of the online documents, the centroid uniquely describing a subject matter of the quantity of the online documents.

17. The non-transitory computer-readable medium of claim 16, wherein the second score is further based on whether a title of the first online document includes one or more words that match the centroid.

18. The non-transitory computer-readable medium of claim 15, wherein the relationship includes a common relationship to a subject matter.

19. The non-transitory computer-readable medium of claim 15, wherein the second score is further based on a number of views that the first online document received within a time frame.

20. The non-transitory computer-readable medium of claim 15, wherein the second score is based on circulation statistics of a first source of the one or more sources, the first source having published the first online document.

21. The non-transitory computer-readable medium of claim 15, the online documents are each weighted for calculating the first score, the weighting based on a respective time when each of the online documents is published.

* * * * *